United States Patent

Inoue et al.

Patent Number: 4,605,727
Date of Patent: Aug. 12, 1986

[54] HIGH MODULUS POLYESTER

[75] Inventors: Toshihide Inoue, Ichinomiya; Toshimasa Hirai; Masaru Okamoto, both of Nagoya, all of Japan

[73] Assignee: Director General of the Agency of Industrial Science and Technology, Tokyo, Japan

[21] Appl. No.: 706,948

[22] Filed: Feb. 28, 1985

[30] Foreign Application Priority Data

Mar. 9, 1984 [JP] Japan .................................. 59-43767
Mar. 9, 1984 [JP] Japan .................................. 59-43768

[51] Int. Cl.⁴ ...................... C08G 63/02; C08G 63/68
[52] U.S. Cl. ................................ 528/191; 528/194; 528/299; 264/176 F
[58] Field of Search .................. 528/191, 194, 299

[56] References Cited

U.S. PATENT DOCUMENTS

| | | | |
|---|---|---|---|
| 4,066,620 | 1/1978 | Kleinschuster et al. | 528/194 X |
| 4,075,262 | 2/1978 | Schaefgen | 528/194 X |
| 4,153,779 | 5/1979 | Jackson et al. | 528/299 X |
| 4,181,792 | 1/1980 | Jackson et al. | 528/194 X |
| 4,342,862 | 8/1982 | Jackson et al. | 528/191 X |
| 4,346,208 | 8/1982 | Fayolle | 528/191 X |
| 4,487,916 | 12/1984 | Irwin | 528/194 X |

Primary Examiner—Lucille M. Phynes
Attorney, Agent, or Firm—Stevens, Davis, Miller & Mosher

[57] ABSTRACT

A high modulus polyester comprising the following structural units (I) and/or (II) and (III), the structural units (I) and (II) occupying 51–99 mol % of the whole and the structural unit (III) occupying 49–1 mol % of the whole, and a high modulus shaped article obtained from the polyester:

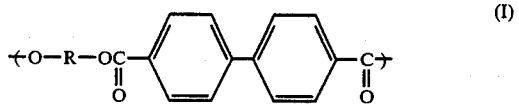

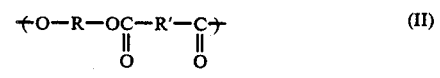

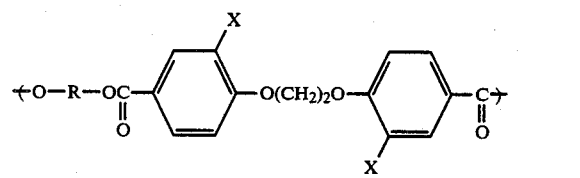

wherein R represents one or more divalent radicals selected from

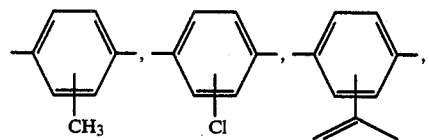

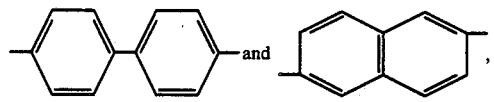

R' represents 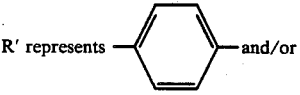

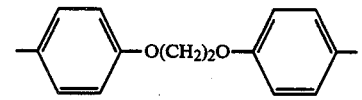

and X represents chlorine or bromine atom.

9 Claims, No Drawings

HIGH MODULUS POLYESTER

BACKGROUND OF THE INVENTION

The present invention relates to a novel aromatic polyester capable of being melt-extruded and affording shaped articles having superior mechanical properties and optical anisotropy.

DESCRIPTION OF THE PRIOR ART

Recently, demand for high performance plastics has been increasing and a number of polymers having various novel performances have been developed and marketed. Above all, optically anisotropic liquid crystal polymers having a parallel arrangement of molecular chains have been attracting a special attention in that they have superior mechanical properties.

As such liquid crystal polymers, wholly aromatic polyesters are widely known. For example, homoand copolymers of p-hydroxybenzoic acid are now available commercially under the trade name "EKONOL". However, these homo- and copolymers "EKONOL" are too high in melting point, so their melt fluidity is poor and their melt extrusion is impossible or difficult. In this connection, reference is made to the "Modern Plastics" (July 1975), p.62 in which there are described copolymers prepared by copolymerizing p-hydroxybenzoic acid with, for example, terephthalic acid and hydroquinone. These copolymers are extremely high in softening point ranging from about 427° to 482° C., so not only their melt extrusion is difficult but also their mechanical properties are not fully satisfactory.

As means for lowering the melting or softening points of such wholly aromatic polyesters to improve their melt extrudability and mechanical properties, there has been proposed, for example, such a method as disclosed in Japanese Patent Publication No. 482/1980 in which polycondensation reactions with various dicarboxylic acids are made using chlorohydroquinone or methylhydroquinone in place of hydroquinone. However, polyesters obtained using terephthalic acid as dicarboxylic acid have the drawback that their melting temperatures are higher than 500° C. On the other hand, as disclosed in Japanese Patent Laid Open No. 65421/1978, polyesters prepared using phenylhydroquinone and terephthalic acid are known to have relatively low melting points, not higher than 350° C., and afford a yarn having a high modulus of about 500 g/d after heat treatment. But, even this modulus is fairly lower than that of 1000 g/d of "Kevlar-49" which is widely known as a wholly aromatic polyamide, and therefore the attainment of a higher modulus has been desired.

SUMMARY OF THE INVENTION

It is the object of the present invention to provide an aromatic polyester capable of being melt extruded and affording shaped articles having superior mechanical properties and optical anisotropy.

Having made extensive studies, the present inventors found out that polyesters of specific compositions of components selected from methylhydroquinone, chlorohydroquinone, phenylhydroquinone, 4,4'-dihydroxybiphenyl, 2,6-dihydroxynaphthalene, 4,4'-diphenyldicarboxylic acid, terephthalic acid, 1,2-bis(phenoxy)ethane-4,4'-dicarboxylic acid, 1,2-bis(2-chlorophenoxy)ethane-4,4'-dicarboxylic acid and 1,2-bis(2-bromophenoxy)ethane-4,4'-dicarboxylic acid could afford a novel aromatic polyester capable of achieving the above-mentioned object.

According to the present invention, therefore, there is provided a melt-extrudable aromatic polyester comprising the following structural units (I) and/or (II) and (III), the structural units (I) and (II) occupying 51 to 99 mol % of the whole and the structural unit (III) occupying 49 to 1 mol % of the whole:

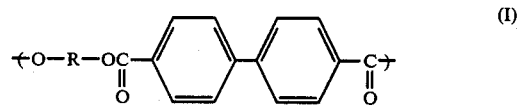

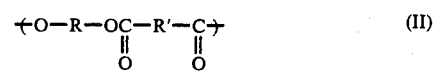

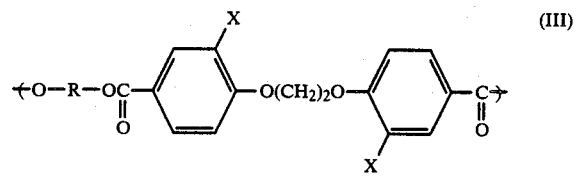

wherein R represents one or more divalent radicals selected from the group consisting of

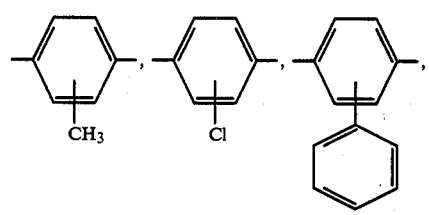

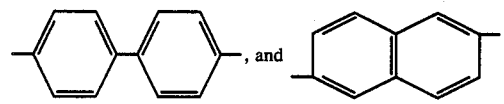

R' represents 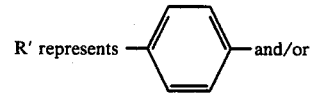 and/or

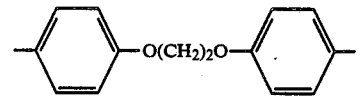

and X represents chlorine or bromine atom.

DESCRIPTION OF THE PREFERRED EMBODIMENTS

In the aromatic polyester of the present invention, the structural unit (I) is of a polyester prepared using one or more diols selected from methylhydroquinone, chlorohydroquinone, phenylhydroquinone, 4,4'-dihydroxybiphenyl and 2,6-dihydroxynaphthalene, and 4,4'-diphenyldicarboxylic acid; the structural unit (II) is of a polyester prepared using the above aromatic diol component and terephthalic acid and/or 1,2-bis(phenoxy)ethane-4,4'-dicarboxylic acid; and the structural unit (III) is of a polyester prepared using the above aromatic diol component and 1,2-bis(2-chlorophenoxy)ethane-4,4'- dicarboxylic acid and/or 1,2-bis(2-bromophenoxy)ethane-4,4'-dicarboxylic acid.

The aromatic polyester of the present invention comprising such structural units usually melts at a temperature not higher than 400° C. and can afford shaped articles such as fibers, films and various molded products having superior mechanical properties and optical anisotropy by conventional melt extrusion techniques such as melt spinning and injection molding. In view of the fact that, for example, the melting point of polyethylene terephthalate is 256° C. and that of poly(ethylene-4,4'-diphenyldicarboxylate) is 355° C., the polyester in the present invention prepared from 4,4'-diphenyldicarboxylic acid which affords a polyester of a higher melting point as compared with terephthalic acid and a diol component such as methylhydroquinone is presumed to have an extremely high melting point. Actually, however, its melting point is not higher than 400° C. and thus relatively low. Besides, it has an extremely high modulus and a good heat stability in comparison with the foregoing prior art polyesters. These effects are quite unexpected.

On the other hand, Japanese Patent Publication No. 482/1980 describes some polyesters prepared from terephthalic acid and/or 1,2-bis(phenoxy)-ethane-4,4'-dicarboxylic acid and diols, e.g. methylhydroquinone. But, shaped articles obtained from those polyesters are poor in heat stability or low in modulus and thus the object of the present invention is not attainable.

Further, polyesters prepared from 1,2-bis(2-chlorophenoxy)ethane-4,4'-dicarboxylic acid and 1,2-bis(2-bromophenoxy)ethane-4,4'-dicarboxylic acid and aromatic diols, e.g. methylhydroquinone are known from Japanese Patent Laid Open No. 41331/1984. But, there still remains unsatisfactoriness in point of modulus and heat stability, and the object of the present invention cannot be attained.

In the aromatic polyester of the present invention, the proportion of the structural units (I) and (II) is 51–99 mol %, preferably 55–95 mol %, of the whole and that of the structural unit (III) is 49–1 mol %, preferably 45–5 mol %, of the whole. Particularly preferably, the polyester contains the structural unit (I) in a proportion of 55–90 mol % of the whole, and most preferably it contains the structural unit (I) in a proportion of 65–90 mol % of the whole. If the proportion of the structural units (I) and (II) is in the range of 99 to 100 mol %, the resulting aromatic polyester will be too high in melting point or inferior in heat stability and mechanical properties, thus making it impossible to attain the object of the present invention. And if the proportion of the structural units (I) and (II) is in the range of 0 to 51 mol % of the whole, the heat stability and mechanical properties of the resulting polyester will be poor, thus making the object of the present invention unattainable.

As the diol component, methylhydroquinone or chlorohydroquinone is preferred, and chlorine atom is preferred as X in the structural formula (III).

Preferably, the aromatic polyester of the present invention has a melt viscosity in the range of 10 to 10,000 poise, more preferably 20 to 5,000 poise. The melt viscosity as referred to herein indicates a value determined using a Koka type flow tester at a temperature of melting point plus 40° to 100° C. and at a shear rate of 2,000 to 4,000 (1/sec). If the melt viscosity is lower than 10 poise, the resulting shaped article will be low in strength, and if the polyester has a melt viscosity higher than 10,000 poise, its moldability will be poor and the resulting shaped article will be inferior in mechanical properties.

The aromatic polyester of the present invention can be prepared according to conventional polycondensation techniques for polyester. No special restrictions are placed on its manufacturing method. For example, the following (1) to (3) are typical methods. (1) Preparation by polycondensation involving removal of monocarboxylic acid, from diester or diesters selected from methylhydroquinone diacetate, chlorohydroquinone diacetate, phenylhydroquinone diacetate, 4,4'-diacetoxybiphenyl and 2,6-diacetoxynaphthalene, and aromatic dicarboxylic acids selected from 4,4'-diphenyldicarboxylic acid, terephthalic acid, 1,2-bis(phenoxy)ethane-4,4'-dicarboxylic acid, 1,2-bis(2-chlorophenoxy)ethane-4,4'-dicarboxylic acid and 1,2-bis(2-bromophenoxy)ethane-4,4'-dicarboxylic acid. (2) Preparation by polycondensation involving removal of phenol, from aromatic diol or diols selected from methylhydroquinone, chlorohydroquinone, phenylhydroquinone, 4,4'-dihydroxybiphenyl and 2,6-dihydroxynaphthalene, and diphenyl esters of the aromatic dicarboxylic acids described in (1). (3) Preparation by reacting the aromatic dicarboxylic acids described in (1) with a desired amount of diphenyl carbonate, then adding the aromatic diol component described in (2) to the resulting diphenyl esters and performing polycondensation reaction involving removal of phenol.

Typical examples of catalyst used in the polycondensation reaction are metallic compounds such as stannous acetate, tetrabutyl titanate, lead acetate, antimony trioxide, sodium acetate and potassium acetate. These metallic compounds are effective especially in the polycondensation involving removal of phenol.

In the polycondensation reaction for preparation of the aromatic polyester of the present invention, aromatic dicarboxylic acids such as isophthalic acid, 3,3'-diphenyldicarboxylic acid, 3,4'-diphenyldicarboxylic acid, 2,2-diphenyldicarboxylic acid and 2,6-naphthalenedicarboxylic acid, alicyclic dicarboxylic acids such as hexahydroterephthalic acid, other aromatic diols such as 4,4'-dioxydiphenyl ether and 2,7-dioxynaphthalene, and other aromatic hydroxycarboxylic acids such as p-hydroxybenzoic acid, may participate in the copolymerization in small amounts not impairing the object of the present invention, in addition to the constituents of the structural units (I)–(III).

The aromatic polyester of the present invention thus prepared, having a low melting point not higher than 400° C., can be subjected to conventional melt processings such as extrusion modling, injection molding, compression molding and blow molding, and formed into fibers, films, three-dimensional products, containers and hoses.

Additives such as reinforcing media, e.g. glass fibers, carbon fibers and asbestos, fillers, nucleating agents, pigments, antioxidants, stabilizers, plasticizers, lubricants, mold release agents and flame-retardants, as well as other thermoplastic resins, may be added to the aromatic polyester of the present invention at the time of molding to impart desired characteristics to the resulting shaped articles.

Shaped articles obtained from the novel aromatic polyester of the invention have a good optical anisotropy which is attributable to the parallel molecular array of the polyester, and are extremely superior in mechanical properties. For example, using the aromatic polyester of the invention there can be obtained fibers having a fineness of 0.5 mm in diameter and a high modulus not less than 50 GPa, as well as a shaped article having a thickness of 1/32 inch and a high modulus not less than 15 GPa.

The following examples are given to further illustrate the invention.

EXAMPLE 1

104.5 g. ($5 \times 10^{-1}$ mol) of methylhydroquinone diacetate, 84.7 g. ($3.5 \times 10^{-1}$ mol) of 4,4'-diphenyldicarboxylic acid, 12.5 g. ($0.75 \times 10^{-1}$ mol) of terephthalic acid and 27.8 g. ($0.75 \times 10^{-1}$ mol) of 1,2-bis(2-chlorophenoxy)ethane-4,4'-dicarboxylic acid were charged into a test tube for polymerization and reacted at 250–320° C. in a nitrogen gas atmosphere for hours, then the pressure was reduced to a vacuum degree of 0.7 mmHg and heating was continued at 320° C. for 1.5 hours to allow polycondensation reaction to proceed. As a result, 58 g. of acetic acid corresponding to 97% of a theoretical amount was distilled out to obtain a highly fibrillated brown polymer. The polymer was of the following theoretical structural formula, and elementary analysis values of the polyester well coincided with theoretical values as set out in Table 1. As a result of infrared spectroscopic analysis, the polyester proved to have characteristic absorption at 1495, 1610 and 1725 cm$^{-1}$.

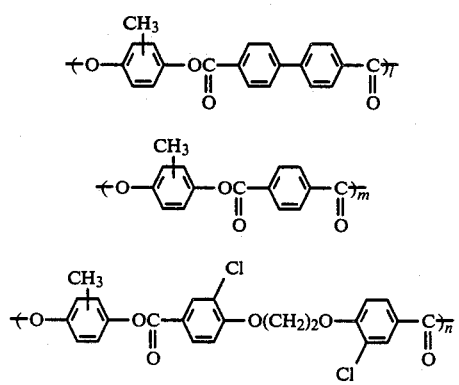

(l/m/n mole ratio=70/15/15)

TABLE 1

|   | Measured Value (wt %) | Theoretical Value (wt %) |
|---|---|---|
| C | 72.9 | 72.4 |
| H | 4.7 | 4.1 |
| Cl | 2.9 | 3.2 |
| O | 19.5 | 20.3 |

Note
The oxygen content (%) was calculated as (100% - C % - H % - Cl %).

The polyester was put on a sample stand of a polarizing microscope, then the temperature was raised and a check was made on optical anisotropy with shear. As a result, the polyester exhibited a good optical anisotropy at temperatures not lower than 223° C. Further, the polyester was measured for thermal characteristics by means of a differential scanning calorimeter (PERKIN-ELMER DSC-2C.) to obtain the following results: glass transition temperature 111° C., melting point 242° C.

Moreover, the polyester was charged to a Koka type flow tester and spun through a spinneret 0.3 mm in diameter at a spinneret temperature of 280° C. to obtain a spun yarn 0.05 mm in diameter. The melt viscosity of the polyester was 1,700 poise at a shear rate of 3,100 (1/sec).

Further, the thus-spun yarn was measured for modulus at a frequency of 110 Hz, a heating rate of 2° C./min and an interchuck distance of 40 mm by means of RHEOVIBRON DDV-II-EA (a product of Toyo Baldwin Co., Ltd.); as a result, it was found to have a modulus as high as 132 GPa.

Moreover, the polymer was injection-molded at 280° C. (mold 30° C.) using Sumitomo NESTAL injection molding machine (0.5 ounce) to obtain a molded product (plaques) having a thickness of 1/32". The molded product was measured for bending modulus using TENSILON UTM-4 (a product of Toyo Baldwin Co., Ltd.) in accordance with ASTM D 790; as a result, it was found to have a bending modulus as high as 29 GPa.

COMPARATIVE EXAMPLE 1

114.8 g. ($5 \times 10^{-1}$ mol) of chlorohydroquinone diacetate, 36.3 g. ($1.5 \times 10^{-1}$ mol) of 4,4'-diphenyldicarboxylic acid and 67.2 g. ($3.5 \times 10^{-1}$ mol) of terephthalic acid (a known composition as described in Japanese Patent Publication No. 482/1980) were charged into a test tube for polymerization and polycondensed in the same way as in Example 1 to obtain an optically anisotropic polyester having a melting point of 290° C.

Using the polyester, spinning was performed in the same manner as in Example 1 to obtain a spun yarn 0.9 mm in diameter. The spun yarn thus obtained was measured for modulus; as a result, it was found to have a modulus of 44 GPa at 30° C., lower than that in Example 1.

Further, the polyester was injection-molded in the same manner as in Example 1 to obtain a molded product having a thickness of 1/32". The molded product was measured for bending modulus, which was found to be 14 GPa, lower than that in Example 1. Example 2–6 and Comparative Examples 2–7

$5 \times 10^{-2}$ mol of diacetate selected from methylhydroquinone diacetate (I) and chlorohydroquinone diacetate (II), and $5 \times 10^{-2}$ mol of dicarboxylic acid or dicarboxylic acids selected from 4,4'-diphenyldicarboxylic acid (III), terephthalic acid (IV), 1,2-bis(2-chlorophenoxy)ethane-4,4'-dicarboxylic acid (V), 1,2-bis(2-bromophenoxy)ethane-4,4'-dicarboxylic acid (VI) and 1,2-bis(phenoxy)ethane-4,4'-dicarboxylic acid (VII), as shown in Table 2, were charged into a test tube for polymerization and polycondensed in the same way as in Example 1.

The resultant polyesters were measured for liquid crystal initiation temperature and melting point; as a result, they proved to be liquid crystal polyesters except the polyesters prepared in Comparative Examples 4 and 5.

Spinning was performed using those polyesters, but the polyesters obtained in Comparative Examples 2 and 3 were too high in melt viscosity to melt-spin and the polyesters in Comparative Examples 4 and 5 were also incapable of being spun. Then, the spun yarns thus obtained were measured for modulus using RHEOVIBRON in the same manner as in Example 1; as a result, the spun yarns obtained from the polyesters of Examples 2–6 were found to have high values of modulus, not lower than 50 GPa, while the spun yarns obtained using the polyesters of Comparative Examples 6 and 7 were low in modulus, not higher than 50 GPa.

TABLE 2

| | Hydroquinone Component | | Dicarboxylic Acid Component | | | | | (III):(IV):(V + VI + VII) (mol ratio) | Liquid Crystal Initiation Temp. (°C.) | Melting Point (°C.) |
|---|---|---|---|---|---|---|---|---|---|---|
| | (I) | (II) | (III) | (IV) | (V) | (VI) | (VII) | | | |
| Example 2 | 100 | — | 80 | 10 | 10 | — | — | 80/10/10 | 248 | 298 |
| Example 3 | 100 | — | 85 | 7.5 | 7.5 | — | — | 85/7.5/7.5 | 268 | 269 |
| Example 4 | — | 100 | 80 | 10 | 10 | — | — | 80/10/10 | 310 | 315 |
| Example 5 | — | 100 | 70 | 15 | 15 | — | — | 70/15/15 | 296 | 313 |
| Example 6 | 100 | — | 70 | 15 | — | 15 | — | 70/15/15 | 304 | 320 |
| Comparative Example 2 | 100 | — | 100 | — | — | — | — | 100/0/0 | 360 | 372 |
| Comparative Example 3 | — | 100 | 100 | — | — | — | — | 100/0/0 | 357 | 354 |
| Comparative Example 4 | 100 | — | — | 100 | — | — | — | 0/100/0 | >500 | — |
| Comparative Example 5 | 100 | — | — | 100 | — | — | — | 0/100/0 | >500 | — |
| Comparative Example 6 | 100 | — | 30 | 70 | — | — | — | 30/70/0 | 272 | 321 |
| Comparative Example 7 | 100 | — | — | 70 | 30 | — | — | 0/70/30 | 257 | 314 |

| | Spinning Temp. (°C.) | Fineness (mm dia.) | Modulus (GPa) | Melt[(1)] Viscosity (poise) |
|---|---|---|---|---|
| Example 2 | 320 | 0.08 | 52 | 400 |
| Example 3 | 330 | 0.08 | 70 | 70 |
| Example 4 | 360 | 0.20 | 51 | 1000 |
| Example 5 | 360 | 0.34 | 52 | 1100 |
| Example 6 | 350 | 0.27 | 56 | 1200 |
| Comparative Example 2 | Spinning was impossible. | | | above 10,000 poise even at 400° C. |
| Comparative Example 3 | Spinning was impossible. | | | above 10,000 poise even at 400° C. |
| Comparative Example 4 | Spinning was impossible. | | | Measurement was impossible |
| Comparative Example 5 | Spinning was impossible. | | | Measurement was impossible |
| Comparative Example 6 | 310 | 0.15 | 31 | 300 |
| Comparative Example 7 | 360 | 0.07 | 49 | 400 |

[(1)]Measured at a spinning temperature of melting point plus 40° to 100° C. and at a shear rate of 2,000 to 4,000 (1/sec).

EXAMPLE 7

114.8 g. (5×10$^{-1}$ mol) of chlorohydroquinone diacetate, 84.7 g. (3.5×10$^{-1}$ mol) of 4,4'-diphenyldicarboxylic acid and 55.7 g. (1.5×10$^{-1}$ mol) of 1,2-bis(2-chlorophenoxy)ethane-4,4'-dicarboxylic acid were charged into a test tube for polymerization and subjected to polycondensation reaction involving removal of acetic acid in the following manner. First, reaction was allowed to take place at 250–310° C. in a nitrogen gas atmosphere for 3 hours, then the temperature was raised to 330° C. at a heating rate of 0.5 hour and at the same time the pressure was reduced to 0.6 mmHg, and heating was further continued for about 1 hour to complete polycondensation. As a result, 60 g. of acetic acid corresponding to 98% of a theoretical amount was distilled out to obtain a highly fibrillated brown polymer.

The polymer was of the following theoretical structural formula, and elementary analysis values of the polyester well coincided with theoretical values as set forth in Table 3. As a result of infrared spectroscopic analysis, the polyester proved to have characteristic absorption at 1485, 1600 and 1735 cm$^{-1}$.

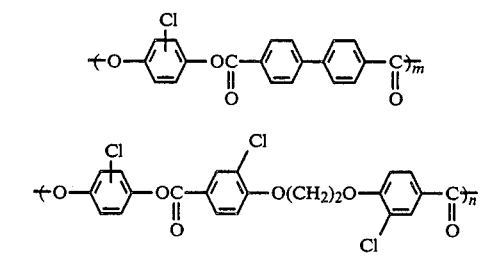

(m/n mole ratio = 70/30)

TABLE 3

| | Measured Value (wt %) | Theoretical Value (wt %) |
|---|---|---|
| C | 67.9 | 67.2 |
| H | 2.7 | 3.2 |
| Cl | 10.2 | 9.6 |

TABLE 3-continued

|  | Measured Value (wt %) | Theoretical Value (wt %) |
|---|---|---|
| O | 19.2 | 20.0 |

Note
The oxygen content (%) was calculated from (100% - C % - H % - Cl %).

The polyester was put on a sample stand of a polarizing microscope, then the temperature was raised and a check was made on optical anisotropy. As a result, the polyester exhibited a good optical anisotropy at temperatures not lower than 289° C.

The polyester was charged to a Koka type flow tester and spun through a spinneret 0.3 mm in diameter at a spinneret temperature of 350° C. to obtain a spun yarn 0.09 mm in diameter. The melt viscosity of the polyester was 220 poise at a shear rate of 3,000 (1/sec).

The spun yarn was measured for modulus at a sample length of 50 mm and at a pulling rate of 10 mm/min by means of TENSILON; as a result, it was found to have a modulus as high as 75 GPa.

Further, the polymer was injection-molded at 350° C. (mold 30° C.) in the same manner as in Example 1 to obtain a molded product having a thickness of 1/32". The molded product was measured for bending modulus, which was found to be as high as 28 GPa.

Moreover, the polymer was measured for thermal characteristics by means of a differential scanning calorimeter; as a result, its glass transition temperature and melting point were 98° C. and 307° C., respectively.

EXAMPLE 8

10.45 g. ($5 \times 10^{-2}$ mol) of methylhydroquinone diacetate, 8.47 g. ($3.5 \times 10^{-2}$ mol) of 4,4'-diphenyldicarboxylic acid and 5.57 g. ($1.5 \times 10^{-2}$ mol) of 1,2-bis(2-chlorophenoxy)ethane-4,4'-dicarboxylic acid were charged into a test tube for polymerization and subjected to polycondensation reaction involving removal of acetic acid in the following manner. First, reaction was allowed to take place at 250–310° C. in a nitrogen atmosphere for 3 hours, then the temperature was raised to 330° C. at a heating rate of 0.5 hour and at the same time the pressure was reduced to 0.6 mmHg, and heating was further continued for 1 hour to complete polycondensation. As a result, 6.01 g. corresponding to 98% of a theoretical amount was distilled out to obtain a highly fibrillated brown polymer.

The polymer was of the following theoretical structural formula, and elementary analysis values of the polyester well coincided with theoretical values as set forth in Table 4. As a result of infrared spectroscopic analysis, the polyester proved to have characteristic absorption at 1500, 1600 and 1720 cm$^{-1}$.

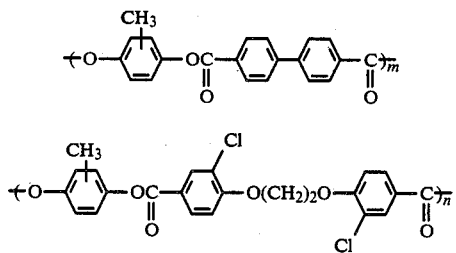

(m/n mole ratio = 70/30)

TABLE 4

|  | Measured Value (wt %) | Theoretical Value (wt %) |
|---|---|---|
| C | 70.7 | 70.3 |
| H | 3.6 | 4.0 |
| Cl | 6.2 | 5.7 |
| O | 19.5 | 20.0 |

Note
The oxygen content (%) was calculated as (100% - C % - H % - Cl %).

The polyester was put on a sample stand of a polarizing microscope, then the temperature was raised and a check was made on optical anisotropy. As a result, the polyester exhibited a good optical anisotropy at temperatures not lower than 238° C. Moreover, the polyester was measured for thermal characteristics by means of a differential scanning calorimeter; as a result, its glass transition temperature and melting point were 125° C. and 251° C., respectively.

Further, the polyester was charged to a Koka type flow tester and spun through a spinneret 0.3 mm in diameter at a spinneret temperature of 310° C. to obtain a spun yarn 0.14 mm in diameter. The melt viscosity of the polyester was 800 poise at a shear rate of 3,000 (1/sec).

The thus-spun yarn was measured for modulus at a sample length of 50 mm and at a pulling rate of 10 mm/min by means of TENSILON; as a result, it was found to have a modulus as high as 58 GPa. Moreover, when measured using VIBRON, the spun yarn proved to have a modulus as high as 73 GPa at 30° C.

COMPARATIVE EXAMPLE 8

10.45 g. ($5 \times 10^{-2}$ mol) of methylhydroquinone diacetate, 3.63 g. ($1.5 \times 10^{-2}$ mol) of 4,4'-diphenyldicarboxylic acid and 10.57 g. ($3.5 \times 10^{-2}$ mol) of 1,2-bis(phenoxy)ethane-4,4'-dicarboxylic acid (a known composition as described in U.S. Pat. No. 3,991,013) were charged into a test tube for polymerization and polycondensed in the same way as in Example 1 to obtain an optically anisotropic polyester having a melting point of 258° C.

The polyester was spun through a spinneret 0.3 mm in diameter at a spinneret temperature of 300° C. to obtain a spun yarn 0.085 mm in diameter. The yarn was measured for modulus using RHEOVIBRON in the same way as in Example 1; as a result, its modulus wass 41 GPa, lower than that of 58 GPa in Example 1.

EXAMPLES 9–13 AND COMPARATIVE EXAMPLE 9

$5 \times 10^{-2}$ mol of diacetate selected from methylhydroquinone diacetate (I) and chlorohydroquinone diacetate (II), and $5 \times 10^{-2}$ mol of dicarboxylic acids selected from 4,4'-diphenyldicarboxylic acid (III), 1,2-bis(2-chlorophenoxy)ethane-4,4'-dicarboxylic acid (IV), 1,2-bis(2-bromophenoxy)ethane-4,4'-dicarboxylic acid (V) and 1,2-bis(phenoxy)ehtane-4,4'-dicarboxylic acid (VI), as shown in Table 5, were polycondensed in a test tube for polymerization.

The resultant polyesters were measured for liquid crystal initiation temperature and melting point, using a differential scanning calorimeter for the measurement of melting point, results of which are as set forth in Table 5.

Further, spun yarns were obtained by spinning of those polyesters and measured for modulus using RHEOVIBRON. As is apparent from the results shown in Table 5, the spun yarns obtained from the polyesters of Examples 9-13 have high values of modulus ranging from 61 to 103 GPa, while the spun yarn obtained from the polyester of Comparative Example 9 has a lower modulus of 40 GPa.

polyester exhibited a good optical anisotropy at temperatures not lower than 262° C.

Moreover, the polyester was measured for thermal characteristics by means of a differential scanning calo-

TABLE 5

| | Hydroquinone Component | | Dicarboxylic Acid Component | | | | (III):(IV + V + VI) mol ratio | Liquid Crystal Initiation Temp. (°C.) | Melting Point (°C.) | Spinning Temp. (°C.) | Fineness (mm dia.) | Modulus (GPa) | Melt[(1)] Viscosity (poise) |
|---|---|---|---|---|---|---|---|---|---|---|---|---|---|
| | (I) | (II) | (III) | (IV) | (V) | (VI) | | | | | | | |
| Example 9 | 100 | — | 85 | 15 | — | — | 85/15 | 275 | 280 | 330 | 0.06 | 83 | 20 |
| Example 10 | 100 | — | 85 | 7.5 | 7.5 | — | 85/15 | 266 | 268 | 320 | 0.24 | 61 | 600 |
| Example 11 | 100 | — | 85 | 7.5 | — | 7.5 | 85/15 | 267 | 269 | 340 | 0.12 | 64 | 500 |
| Example 12 | — | 100 | 85 | 7.5 | — | 7.5 | 85/15 | 312 | 303 | 360 | 0.09 | 103 | 900 |
| Example 13 | — | 100 | 70 | 15 | — | 15 | 70/30 | 286 | 301 | 360 | 0.05 | 85 | 1500 |
| Comparative Example 9 | — | 100 | 30 | — | — | 70 | 30/70 | 231 | 263 | 280 | 0.10 | 40 | 400 |

[(1)]Measured at a spinning temperature of melting point plus 40-100° C. and at a shear rate of 2,000 to 4,000 (1/sec).

EXAMPLE 14

11.48 g. ($5 \times 10^{-2}$ mol) of chlorohydroquinone diacetate, 5.57 g. ($1.5 \times 10^{-2}$ mol) of 1,2-bis(2-chlorophenoxy)ethane-4,4'-dicarboxylic acid and 5.81 g. ($3.5 \times 10^{-2}$ mol) of terephthalic acid were charged into a test tube for polymerization and subjected to polycondensation reaction involving removal of acetic acid in the following manner. First, reaction was allowed to take place at 250-330° C. in a nitrogen gas atmosphere for 2.5 hours, then the pressure was reduced to 0.5 mmHg and heating was continued for another 1 hour to complete polycondensation. As a result, 5.7 g. of acetic acid corresponding to 96% of a theoretical amount was distilled out to obtain a silver black polyester.

The polyester was of the following theoretical structural formula, and elementary analysis values thereof well coincided with theoretical values as set forth in Table 6. In infrared spectroscopic analysis, the polyester exhibited characteristic absorption at 1400, 1480, 1590 and 1735 cm$^{-1}$.

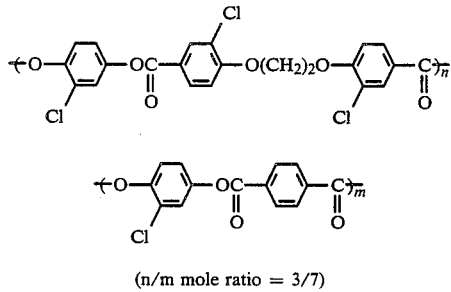

(n/m mole ratio = 3/7)

TABLE 6

| | Measured Value (wt %) | Theoretical Value (wt %) |
|---|---|---|
| C | 54.2 | 55.3 |
| H | 2.4 | 2.5 |
| Cl | 14.8 | 16.0 |
| O | 28.6 | 26.2 |

Note
The oxygen content (%) was calculated as (100% - C % - H % - Cl %).

The polyester was put on a sample stand of a polarizing microscope, then the temperature was raised and a check was made on optical anisotropy. As a result, the polyester exhibited a good optical anisotropy at temperatures not lower than 262° C.

Moreover, the polyester was measured for thermal characteristics by means of a differential scanning calorimeter; as a result, its glass transition temperature and melting point were 117° C. and 297° C., respectively.

Further, the polyester was charged to a Koka type flow tester and spun through a spinneret 0.3 mm in diameter at a spinneret temperature of 360° C. to obtain a spun yarn 0.036 mm in diameter. The melt viscosity of the polyester was 300 poise at 360° C. and at a shear rate of 3,100 (1/sec).

The spun yarn was measured for modulus using RHEOVIBRON; as a result, it proved to have a modulus as high as 110 GPa at 30° C.

COMPARITIVE EXAMPLE 10

Phenylhydroquinone and terephthalic acid were polymerized in accordance with Japanese Patent Publication No. 40978/1983, and yarn was obtained by spinning of the resultant polyester and it was measured for modulus, which was found to be as low as 20 GPa at 30° C. Moreover, chlorohydroquinone and 1,2-bis(phenoxy)ethane-4,4'-dicarboxylic acid were polymerized in accordance with Japanese Patent Publication No. 482/1980, and yarn was obtained by spinning of the resultant polyester and it was measured for modulus, which was found to be as low as 12 GPa at 30° C.

EXAMPLE 15

10.45 g. ($5 \times 10^{-2}$ mol) of methylhydroquinone diacetate as a substitute for the 11.48 g. ($5 \times 10^{-2}$ mol) chlorohydroquinone diacetate used in Example 15, 5.57 g. ($1.5 \times 10^{-2}$ mol) of 1,2-bis(2-chlorophenoxy)-ethane-4,4'-dicarboxylic acid and 5.81 g. ($3.5 \times 10^{-2}$ mol) of terephthalic acid were reacted at 250-320° C. for 3 hours as in Example 1, thereafter the pressure was reduced to 0.5 mmHg, at which pressure reaction was allowed to proceed for another 1 hour. As a result, 5.8 g. of acetic acid corresponding to 97% of a theoretical amount was distilled out to obtain a brown polyester.

The polyester was of the following theoretical structural formula, and elementary analysis values thereof well coincided with theoretical values as shown in Table 7. In infrared spectroscopic analysis, the polyester exhibited characteristic absorption at 1500, 1600 and 1740 cm$^{-1}$.

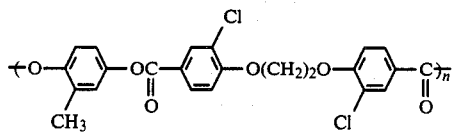

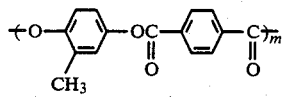

(n/m mole ratio = 3/7)

TABLE 7

| | Measured Value (wt %) | Theoretical Value (wt %) |
|---|---|---|
| C | 65.4 | 66.2 |
| H | 3.9 | 3.7 |
| Cl | 7.5 | 6.8 |
| O | 23.2 | 23.3 |

Note
The oxygen content (%) was calculated as (100% - C % - H % - Cl %).

Using a polarizing microscope, the polyester was checked for optical anisotropy; as a result, it exhibited a good optical anisotropy at temperature not lower than 245° C.

Further, the polyester was measured for thermal characteristics by means of a differential scanning calorimeter; as a result, its glass transition temperature, melting point and temperature of crystallization on cooling were 128° C., 287° C. and 215° C., respectively.

A 0.045 mm dia. yarn was obtained by spinning of the polyester at 305° C. as in Example 1. It proved to have a modulus as high as 68 GPa at 30° C. when measured using RHEOVIBRON.

EXAMPLES 16–20 AND COMPARATIVE EXAMPLES 11–14

The following aromatic diols (I)–(V) and aromatic dicarboxylic acids (VI)–(IX) were combined as shown in Table 8, charged into test tubes for polymerization so that in each combination the amount of aromatic diol component and that of aromatic dicarboxylic acid component were each $0.5 \times 10^{-2}$ mol, and polycondensed therein:

(I) chlorohydroquinone diacetate
(II) methylhydroquinone diacetate
(III) phenylhydroquinone diacetate
(IV) 4,4'-diacetoxybiphenyl
(V) 2,6-diacetoxynaphthalene
(VI) 1,2-bis(2-chlorophenoxy)ethane-4,4'-dicarboxylic acid
(VII) 1,2-bis(2-bromophenoxy)ehtane-4,4'-dicarboxylic acid
(VIII) 1,2-bis(phenoxy)ethane-4,4'-dicarboxylic acid
(IX) terephthalic acid The polyesters thus obtained were checked for optical anisotropy, results of which are as set forth in Table 8. Reference to Table 8 shows that all of the polyesters obtained in Examples 16–20 exhibit good optical anisotropy and fluidity, while the polyesters obtained in Comparative Examples 11–14 are all high in melt viscosity and poor in fluidity.

TABLE 8

| | Diol Component (mol %) | | | | | Dicarboxylic Acid Component (mol %) | | | | [(VIII) + (IX)]/ [(VI) + (VII)] (mol ratio) | Liquid Crystal Initiation Temp. (°C.) | Melting Point (°C.) | Melt[1] Viscosity (poise) |
|---|---|---|---|---|---|---|---|---|---|---|---|---|---|
| | (I) | (II) | (III) | (IV) | (V) | (VI) | (VII) | (VIII) | (IX) | | | | |
| Example 16 | 100 | — | — | — | — | 30 | — | 70 | — | 70/30 | 226 | 245 | 300 |
| Example 17 | — | 100 | — | — | — | — | 30 | 70 | — | 70/30 | 201 | 234 | 300 |
| Example 18 | — | — | 100 | — | — | 30 | — | — | 70 | 70/30 | 197–339 | not clear | 200 |
| Example 19 | — | — | — | 100 | — | 30 | — | 70 | — | 70/30 | 303 | 327 | 300 |
| Example 20 | — | — | — | — | 100 | 30 | 0 | 70 | 0 | 70/30 | 308 | 315 | 300 |
| Comparative Example 11 | — | — | — | 100 | — | — | — | — | 100 | 100/0 | >500 | — | Measurement was impossible. |
| Comparative Example 12 | — | — | — | — | 100 | — | — | — | 100 | 100/0 | >500 | — | impossible. |
| Comparative Example 13 | — | — | — | 100 | — | — | — | 100 | — | 100/0 | 370 | 395, 410 | more than 10,000 poise |
| Comparative Example 14 | — | — | — | — | 100 | — | — | 100 | — | 100/0 | 378 | 395 | |

[1]Measured at a temperature of melting point plus 40–100° C. and at a shear rate of 2,000 to 4,000 (1/sec.)

What is claimed is:

1. A high modulus polyester consisting essentially of the following structural units (I) and/or (II) and (III), the structural units (I) and (II) occupying 51–99 mol % of the whole and the structural unit (III) occupying 49-1 mol % of the whole:

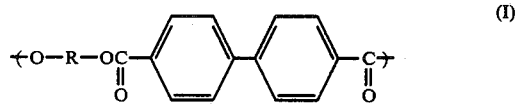 (I)

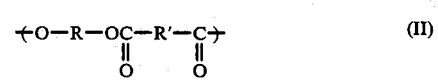 (II)

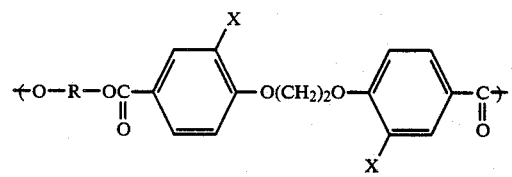 (III)

wherein R represents one or more divalent radicals selected from the group consisting of

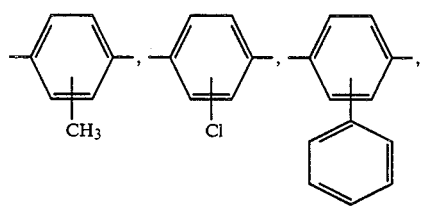

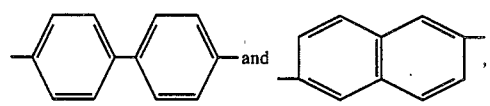

R' represents 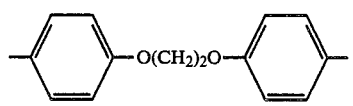

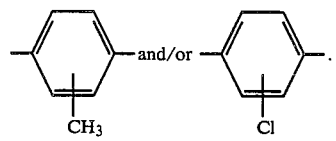

and X represents chlorine or bromine atom.

2. A high modulus polyester as set forth in claim 1, wherein the structural units (I) and (II) occupy 55–95 mol % of the whole and the structural unit (III) occupies 45–5 mol % of the whole.

3. A high modulus polyester as set forth in claim 1, wherein the structural unit (I) occupies 55–90 mol % of the whole.

4. A high modulus polyester as set forth in claim 1, wherein the structural unit (II) occupies 55–95 mol % of the whole.

5. A high modulus polyester as set forth in claim 1, wherein the R in the structural units (I)–(III) is

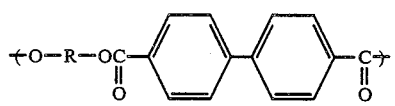

6. A high modulus polyester as set forth in claim 1, wherein the X in the structural unit (III) is chlorine atom.

7. A shaped article obtained by extrusion of a polyester consisting essentially of the following structural units (I) and/or (II) and (III), the structural units (I) and (II) occupying 51–99 mol % of the whole and the structural unit (III) occupying 49–1 mol % of the whole:

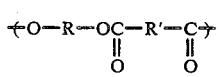 (I)

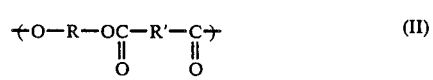 (II)

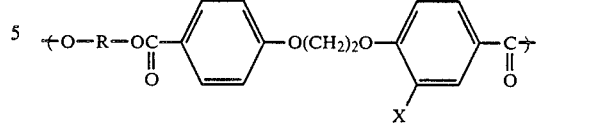

wherein R represents one or more divalent radicals selected from the group consisting of

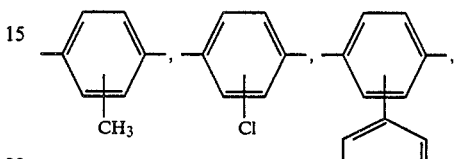

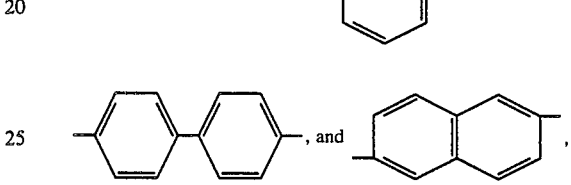

R' represents 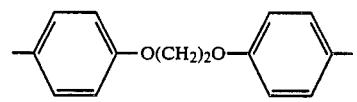

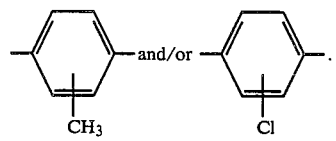

and X represents chlorine or bromine atom.

8. A shaped article as set forth in claim 7 having a bending modulus not smaller than 15 GPa.

9. A fiber having a modulus not smaller than 50 GPa obtained by melt spinning of a polyester, said polyester consisting essentially of the following structural units (I) and/or (II) and (III), the structural units (I) and (II) occupying 51–99 mol % of the whole and the structural unit (III) occupying 49–1 mol % of the whole:

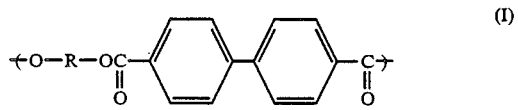 (I)

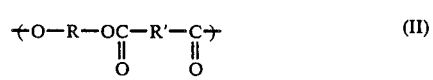 (II)

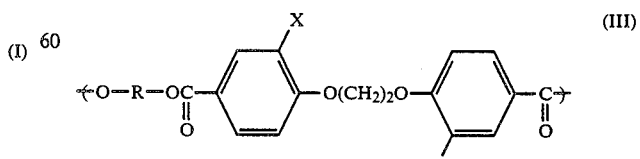 (III)

wherein R represents one or more divalent radicals selected from the group consisting of

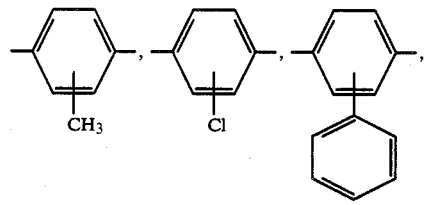
-continued
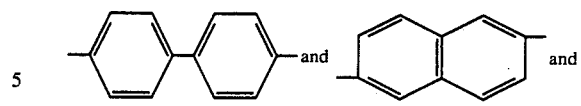
R' represents 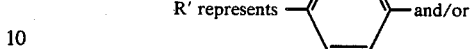 and/or
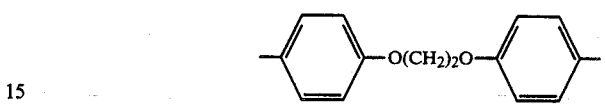
and X represents chlorine or bromine atom.
* * * * *